United States Patent [19]

Dobo

[11] 4,089,921

[45] May 16, 1978

[54] PROCESS FOR SINTERED BI-METALLIC FILAMENTARY COMPOSITES

[75] Inventor: Emerick J. Dobo, Cary, N.C.

[73] Assignee: Monsanto Company, St. Louis, Mo.

[21] Appl. No.: 629,184

[22] Filed: Nov. 5, 1975

[51] Int. Cl.[2] .......................... C04B 35/64; B29F 3/10

[52] U.S. Cl. ................................... 264/63; 75/208 R; 75/208 CS; 75/211; 75/DIG. 1; 264/67; 264/82; 264/147; 264/171; 264/DIG. 19

[58] Field of Search ............. 264/60, 63, 65, DIG. 19; 75/208 R, 208 CS, 211; 428/373, 374, 379

[56] References Cited

U.S. PATENT DOCUMENTS

| | | | |
|---|---|---|---|
| 2,900,708 | 8/1959 | Pond | 204/71 |
| 3,281,261 | 10/1966 | Lynch | 264/60 |
| 3,320,039 | 5/1967 | Hollister | 428/373 |
| 3,436,248 | 4/1969 | Dittrich et al. | 428/379 |
| 3,445,361 | 5/1969 | Sicka et al. | 264/60 |
| 3,450,510 | 6/1969 | Calow | 264/60 |
| 3,503,844 | 3/1970 | Clemens | 264/171 |
| 3,504,730 | 4/1970 | Dannohl | 164/50 |
| 3,639,953 | 2/1972 | Kimura et al. | 264/171 |
| 3,640,693 | 2/1972 | Gallasso et al. | 264/60 |
| 3,713,865 | 1/1973 | Leeds | 264/29.2 |
| 3,725,186 | 4/1973 | Lynch | 264/60 |
| 3,791,798 | 2/1974 | Joyce et al. | 428/373 |
| 3,846,527 | 11/1974 | Wrater et al. | 264/63 |
| 3,907,954 | 9/1975 | Mansmann et al. | 264/63 |
| 4,010,233 | 3/1977 | Wrater | 264/63 |

*Primary Examiner*—Jay H. Woo
*Attorney, Agent, or Firm*—Howard C. Stanley; Russell E. Weinkauf; James W. Williams, Jr.

[57] ABSTRACT

Novel bi-metallic filamentary composites are produced by first forming a conjugate precursor filament comprised of an organic polymer together with particles of a first reducible metal oxide and particles of a second reducible metal oxide with the metal component of each of the two metal oxides being sinterable at a temperature which is below the melting point of the other. The structure of the precursor is characterized by a first longitudinally extending layer along its length which contains the particles of the first reducible metal oxide, and an adhering second essentially distinct longitudinally extending layer extending along its length which contains the particles of the second reducible metal oxide. The essentially discrete layers may be in a sheath-core arrangement or in side-by-side relationship.

Conversion to the bi-metallic filamentary product is accomplished by exposing the precursor filament to a reducing environment at a temperature and dwell time sufficient for effecting a reduction and sintering of the metal particles. The temperatures employed are in a range which is below the melting point of the metal particles and above the vaporization or decomposition temperature of the non-metal components of the precursor filament.

4 Claims, No Drawings

PROCESS FOR SINTERED BI-METALLIC FILAMENTARY COMPOSITES

This invention relates to a method for producing bi-metallic filamentary composites and the resulting products. Among other applications the products have utility as a heat sensor in temperature regulation instruments.

Polymeric filaments consisting of two or more components and the methods by which they can be fabricated are well known in the textile art. Such filaments are generally produced by extruding the different components from the spinneret in side-by-side relationship or in a sheath-core arrangement. It has now been found that these techniques can be successfully utilized in the fabrication of bi-metallic filamentary composites.

In accordance with the present invention conjugate filaments composed of two different metals can be produced by a method, which stated broadly, includes the following steps: (1) preparing a first and second spinning dope, wherein the first spinning dope is comprised of particles of a first reducible metal oxide uniformly dispersed in a fiber-forming polymer solution and the second spinning dope is comprised of a second reducible metal oxide likewise uniformly dispersed in a fiber-forming polymer solution; (2) simultaneously extruding the first and second spinning dopes through an orifice to form a unitary precursor filament having a first longitudinally extending layer along its length containing particles of the first reducible metal oxide and an adhering second essentially distinct longitudinally extending layer along the filament length which contains the particles of the second reducible metal oxide; and (3) converting the precursor filament to a bi-metallic conjugate filament by exposing the precursor to a reducing environment at a temperature and for a dwell time which is sufficient for effecting a reduction and sintering of the metal particles, said temperature being in a range which is below the melting point of the metal particles and above the vaporization or decomposition temperature of the non-metal components of the precursor filament.

The metal oxide particles which are used in preparing the spinning dopes should possess a good distribution in particle size in order to achieve the desired density in the untimate bi-metallic filamentary product. However, the average diameter of the particles should not exceed about 5 microns, with an average diameter of about 1 micron or less being usually preferred.

Any metal oxide compound that is capable of reduction and sintering may be used in practicing the invention. The reduction temperatures must, of course, be below the vaporization point of the compounds being reduced and of the elemental metals formed. Metal oxides which vaporize or sublime at temperatures below that at which they will react with hydrogen or where the metal component of such compounds has such a low temperature of vaporization or sublimation are not reducible to the metal phase as required for the purposes of this invention. As a general rule, any metal oxide compound susceptible of reduction to elemental metal with hydrogen and which has standard free energies of reaction with hydrogen that are less than about +15 kilocalories per gram atom of hydrogen at the reduction temperature may be utilized. As examples of such readily reducible metal compounds, the oxides of Fe, Co, Ni, Cu, Mo, W and Cr are noted.

The expression "metal compounds having standard free energies of reaction with hydrogen to form elemental metal of less than about +15 kilocalories per gram atom of hydrogen at the reduction temperature" refers to ΔF. (standard free energies of reaction defined as follows:

$$\Delta F^{\circ}_{T} = \Delta H^{\circ}_{T} - T\Delta S^{\circ}_{T}$$

where $\Delta H^{\circ}$ = standard heat of reaction at temperature T $\Delta S^{\circ}$ = standard entropy of reaction at temperature T $T$ = the temperature of interest (i.e. the reduction temperature)

The word "standard" as it relates to ΔH°, ΔS° and ΔF° means the standard states for condensed phases (solid or liquid) of pure materials (i.e. metal compounds) at atmospheric pressure and the temperature of interest (T) and the standard states for gaseous phases at unit fugacity and at the temperature of interest (T). In utilizing the formulation temperature T is expressed in Kelvin.

In selecting reducible metal oxide compounds which may be paired or used in combination to produce the bi-metallic filamentary structure of this invention, it is necessary that the metal component of each of the two compounds have the capability for being sintered at a temperature which is below the melting point of the other. Thus, for example, a refractory metal oxide such as tungsten oxide cannot be satisfactorily combined with the oxide of a soft non-ferrous metal such as copper, although both metal oxides are readily reducible. Suitable combinations, such as iron oxide with nickel oxide or iron oxide with cobalt oxide, are readily determinable by those of oridinary skill in the metallurgical art.

As has been noted, the metal oxide compounds in particulate form are incorporated into spinning dopes from which filaments may be formed by well-known solution spinning techniques. That is, one of the selected metal oxide compounds is uniformly dispersed in a fiber-forming polymer solution, while the other metal oxide is likewise dispersed in a separate fiber-forming polymer solution. Aside from the difference in metal oxide content, the two spinning dopes will otherwise generally have the same composition, although this need not necessarily be the case. This is, the dopes may contain different but compatible polymer systems. Such compatible polymers are known and used in the textile art for producing bi-component fibers.

The fiber-forming polymers used in making-up the spin dopes may be selected from any of those which are known to be useful in the formation of fibers by solution spinning procedures. Included among such polymeric materials are, for example, polyesters, polyamides, cellulose acetate and the acrylic polymers. Particularly suitable spinning compositions consist of solutions of the various fiber-forming acrylic polymers in a dimethylacetamide solvent.

The concentration of metal oxide particles in the spinning dopes can and will vary widely depending upon the polymer system employed, the molecular weight of the particular metal oxide and the density desired in the ultimate bi-metallic filamentary product. It has been found, for example, that when the particles consist of iron oxide and the fiber-forming polymer solution consists of an acrylic polymer dissolved in dimethylacetamide, good results are obtained when the weight ratio of iron oxide to acrylic polymer is within the range of from about 3:1 to 7:1. Suitable concentrations for other metal oxide compounds in acrylic polymer or other polymeric spinning systems can be readily determined by simple experiment.

As has been noted, the well-known bi-component spinning procedures of the textile art are utilized to form the precursor filaments of the instant invention. This involves separately metering the two spinning dopes (each containing a different metal oxide) to a shaped spinneret orifice where they are simultaneously extruded. The orifice is adapted to receive the components separately for simultaneous extrusion to form a filament in which each component is substantially localized but is held in an adhering relationship to the other component. Thus, a filament is formed having a first longitudinally extending layer along its length which contains the particles of one reducible metal oxide, and an adhering second essentially distinct longitudinal layer extending along its length which contains the particles of the other reducible metal oxide. Depending upon the design of the spinneret used, the extrusion can be such that the components are localized and held together in a "side-by-side" structure in which both components form part of the surface of the composite. The extrusion may also be such that one component forms a core and the other a sheath to form a composite referred to as a "sheath-core" structure. In this structure only the sheath contributes to the surface of the composite. The composite precursor filaments may be drawn or stretched after formation to improve their tenacity for further handling. This may be followed by a shrinking treatment, if desired, to enhance filament toughness.

Although the environment for reducing the metal oxide compounds generally includes hydrogen, it need not consist solely of hydrogen. For example, it has been found that most metal oxides and particulary the iron oxides can be effectively reduced in an atmosphere consisting of a combination of hydrogen and carbon monoxide.

The temperatures employed in accomplishing the reduction and sintering of the metal particles present in the precursor filaments will lie in a range which is below the melting point of the particular metal compounds employed and above the vaporization or decomposition temperature of the non-metal components of the filaments. The appropriate temperatures within this range will, of course, vary depending upon the particular metal oxide compounds which are present in the precursor. However, the preferred temperatures at which hydrogen reducible metal compounds will reduce and sinter are known and readily ascertainable by those of ordinary skill in the metallurgical art. Likewise, the exposure tiem required to effect a reduction and sintering at the conditions in which this can be accomplished is easily determinable.

In a preferred mode for carrying out the precursor conversion step of the process, the precursor filaments are processed through an elongated furnace which has been heated to an appropriate temperature. The reducing gases are caused to flow within the furnace in a reverse direction to the direction of movement of the filaments. In this manner, the filaments being processed never "see" an oxidizing environment until the procedure is completed and the bi-metallic filamentary product exits the furnace. The structure of the bi-metallic composite filaments which are obtained following the conversion step essentially corresponds to that of the precursor filaments, that is, each filament contains a first longitudinally extending layer along its length consisting of one metal, and an adhering second essentially distinct longitudinal layer extending along the filament length consisting of a second metal. The distinct layers will be in a side-by-side or sheath-core relationship depending upon the arrangement in the precursor.

As an alternative to producing bi-component precursor filaments by spinning techniques, film casting and slitting procedures may likewise be utilized. This involves the use of two separate film-forming dopes each of which contains a film-forming polymer solution. A first reducible metal oxide is uniformly dispersed in one of the dopes while a second and different reducible metal oxide is likewise dispersed in the other film-forming dope. The dopes are then cast one over the other and coagulated to form a conjugate film. Precursor filaments are then slit from the two layered film in which one layer contains one of the reducible metal oxides and the other layer contains the second reducible metal oxide. The precursor obtained is converted to a bi-metallic filamentary composite in the same manner and under the same conditions as described hereinabove for the precursors produced by spinning techniques. In practicing the method, any film-forming polymer solution may be used. As was previously mentioned, the metal oxide particles employed should have an average diameter of less than about 5 microns. It is also, of course, necessary that the metal component of each of the reducible metal oxides which are dispersed in the film forming dopes have the capability for being sintered at a temperature below the melting temperature of the other. The following example illustrates this embodiment of the invention.

EXAMPLE

A first film-forming dope was prepared which contained 39.4 grams of NiO uniformly dispersed in a solution which contained 5.3 grams of a copolymer consisting of 93 percent by weight of acrylonitrile and 7 percent by weight of vinyl acetate dissolved in 30.0 cc of dimethylacetamide. A second film-forming dope was also prepared in which 30.0 grams of $Fe_2O_3$ was uniformly dispersed in a solution which also contained 5.3 grams of a copolymer consisting of 93 percent by weight of acrylonitrile and 7 percent by weight of vinyl acetate dissolved in 30 cc of dimethylacetamide. The first and second film-forming dopes were then cast one on top of the other. The joined films were coagulated in water to produce a composite film from which precursor filaments were slit. The precursor filaments were then converted to a bi-metallic filamentary structure by heating at a temperature of 1000° C for a period of 3 minutes in a reducing atmosphere consisting of 93.5% hydrogen and 6.5% carbon monoxide. The bi-metallic filament obtained contained two distinct longitudinally extending components. One component consisted of nickel and the other steel. Steel was formed by the diffusion of carbon present in the system into the iron oxide.

Although the invention has been described with respect to details of the preferred embodiments, many modifications and variations which clearly fall within the scope of the invention as defined by the following claims will become apparent to those skilled in the art.

I claim:

1. A method for producing a bi-metallic composite filament with the aid of a fiber-forming polymer, said method comprising the following steps in sequence:

(a) providing a first and second spinning dope, wherein said first spinning dope is comprised of particles of a first reducible metal oxide uniformly dispersed in a fiber-forming polymer solution and said second spinning dope is comprised of particles of a second reducible metal oxide uniformly dispersed in a fiber-forming polymer solution, wherein the particles of said first and second reducible metal oxides have an average diameter of less than about 5 microns, and wherein the metal component of each of said reducible metal oxides is sinterable at a temperature below the melting temperature of the other;

(b) simultaneously extruding said first and second spinning dopes through an orifice to form a unitary precursor filament having a first longitudinally extending layer along its length which contains the particles of said first reducible metal oxide, and an adhering second essentially distinct longitudinally extending layer extending along the filament length which contains the particles of said second reducible metal oxide; and (c) exposing said precursor filament to a reducing environment consisting essentially of hydrogen gas or a mixture of hydrogen and carbon monoxide gases at a temperature and for a period of time sufficient to effect a reduction and sintering of said metal particles, said temperature being below the melting point of the metal particles and above the vaporization or decomposition temperature of the non-metal components of said precursor filament.

2. The method of claim 1, wherein said fiber-forming polymer is an acrylic polymer.

3. The method of claim 1, wherein said first reducible metal oxide is an iron oxide and wherein said second reducible metal oxide is nickel oxide.

4. A method for producing bi-metallic composite filaments which comprises:

(a) providing a first and second film-forming dope, wherein said first dope is comprised of particles of a first reducible metal oxide uniformly dispersed in a film-forming polymer solution and said second dope is comprised of particles of a second reducible metal oxide uniformly dispersed in a film-forming polymer solution, wherein the particles of said first and second reducible metal oxides have an average diameter of less than about 5 microns, and wherein the metal component of each of said reducible metal oxides is sinterable at a temperature below the melting temperature of the other:

(b) casting said first and second film-forming dopes one on top of the other to produce a two-layered conjugate film with one layer containing said first reducible metal oxide and the other layer containing said second reducible metal oxide.

(c) slitting said two-layered film to obtain filaments having two essentially discrete layers, with one layer containing said first reducible metal oxide and the other layer containing said second reducible metal oxide; and (d) exposing said filaments to a reducing environment consisting essentially of hydrogen or a mixture of hydrogen and carbon monoxide at a temperature and for a period of time sufficient to effect a reduction and sintering of said metal particles, said temperature being below the melting poing of the metal particles and above the vaporization or decomposition temperature of the non-metal components of said filaments.

* * * * *